United States Patent
Chiu

(10) Patent No.: US 8,128,774 B2
(45) Date of Patent: Mar. 6, 2012

(54) PROCESS OF MANUFACTURING PAPERBOARD WITH TEXTILE SURFACE

(76) Inventor: Kuo-tzu Chiu, Tianjin (CN)

( * ) Notice: Subject to any disclaimer, the term of this patent is extended or adjusted under 35 U.S.C. 154(b) by 101 days.

(21) Appl. No.: 12/624,385

(22) Filed: Nov. 23, 2009

(65) Prior Publication Data

US 2011/0120643 A1    May 26, 2011

(51) Int. Cl.
*B32B 37/12* (2006.01)
*B32B 37/06* (2006.01)

(52) U.S. Cl. .............. 156/244.27; 156/324; 156/334

(58) Field of Classification Search .......... 156/244.11, 156/244.27, 334, 324
See application file for complete search history.

(56) References Cited

U.S. PATENT DOCUMENTS

| | | | | |
|---|---|---|---|---|
| 3,370,106 | A | * | 2/1968 | Hall, Jr. et al. ............... 525/240 |
| 4,294,876 | A | * | 10/1981 | Camden et al. ................ 428/95 |
| 4,326,543 | A | * | 4/1982 | Martin et al. .................. 131/362 |
| 4,849,278 | A | * | 7/1989 | Stokes .......................... 428/153 |
| 2004/0009732 | A1 | * | 1/2004 | Nowak ......................... 442/412 |

* cited by examiner

*Primary Examiner* — Katarzyna Wyrozebski Lee
*Assistant Examiner* — Scott W Dodds

(57) ABSTRACT

A process of manufacturing paperboard includes mixing a predetermined weight percentage of polypropylene and a predetermined weight percentage of polyethylene in a tank; heating the tank to a predetermined temperature for forming an adhesive of the polypropylene and the polyethylene; flowing the adhesive out of the tank to coat on an outer surface of an endless, continuous paperboard member moving thereunder; and moving an endless, continuous textile to place on the adhesive at a joining line of a pair of opposite rotating rolls so that the rolls press the textile, the adhesive, and the paperboard member to cause the adhesive to adhere the textile and the paperboard member together to produce the finished paperboard having a textile surface.

4 Claims, 1 Drawing Sheet

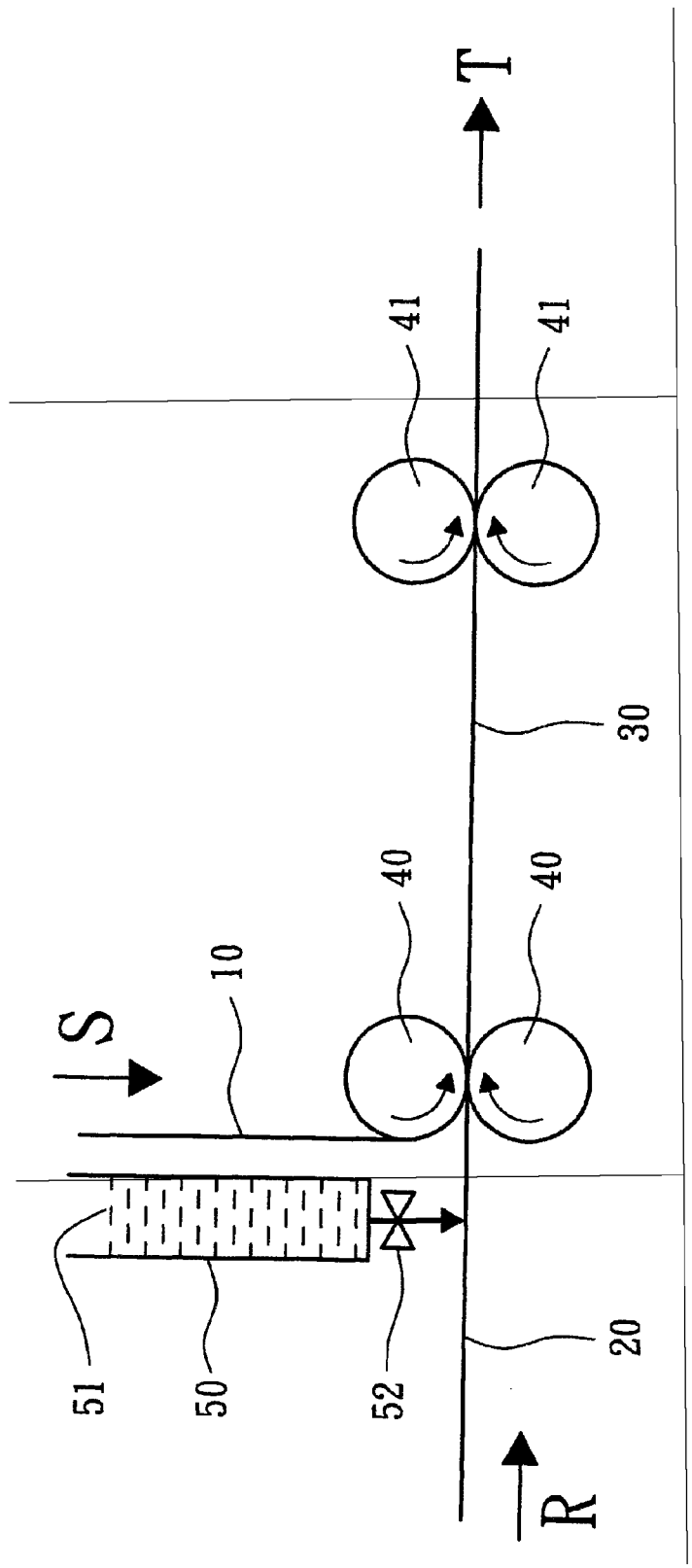

PROCESS OF MANUFACTURING PAPERBOARD WITH TEXTILE SURFACE

BACKGROUND OF THE INVENTION

1. Field of Invention

The invention relates to the manufacture of paperboard and more particularly to a process of manufacturing paperboard having a textile (or non-woven textile) surface by adhering an adhesive (mixing with polypropylene and polyethylene) therebetween.

2. Description of Related Art

A conventional process of manufacturing paperboard having a textile or non-woven textile surface involves the steps of adhering a commercially available glue therebetween and drying same.

However, the well known process of manufacturing paperboard having a textile or non-woven textile surface is disadvantageous because its efficiency is low, cost is high, quality is poor, and its applications are few. Thus, the need for improvement still exists.

SUMMARY OF THE INVENTION

It is therefore one object of the invention to provide a process of manufacturing paperboard having a textile or non-woven textile surface by adhering an adhesive therebetween in which the adhesive is comprised of a mixture of polypropylene and polyethylene.

The above and other objects, features and advantages of the invention will become apparent from the following detailed description taken with the accompanying drawings.

BRIEF DESCRIPTION OF THE DRAWINGS

FIG. 1 schematically depicts a process of manufacturing paperboard with a textile surface according to the invention.

DETAILED DESCRIPTION OF THE INVENTION

Referring to FIG. 1, a process of manufacturing paperboard in accordance with the invention is illustrated below.

First, pour particles of polypropylene and particles of polyethylene into a tank 50 and mix same. Next, heat the tank 50 to a temperature in a range of 280° C. to 330° C. The particles of polypropylene and polyethylene are thus molten to form an adhesive 51 at this temperature range. Weight percentage of the polypropylene is about 70% to 85% and weight percentage of the polyethylene is about 15% to 30% respectively.

Next, open a bottom valve 52 of the tank 50 to allow the adhesive 51 to flow out of the tank 50 onto an outer surface of an endless, continuous paperboard 20 moving in a direction as indicated by arrow R. Preferably, about 10 g to 25 g of the adhesive 51 falls onto per square meter of the outer surface of the moving paperboard 20. It is contemplated by the invention that the resulting paperboard 20 has a smooth surface due to the coating of the adhesive 51 thereon.

At the same time, an endless, continuous textile (or non-woven textile) 10 moving in a direction as indicated by arrow S is placed on the adhesive 51 at a joining line of a pair of opposite drive rolls 40. At the joining line of the pair of opposite drive rolls 40 the textile 10 is pressed onto the adhesive 51 which is in turn pressed onto the paperboard 20. As a result, a finished paperboard 30 comprised of the paperboard 20 on the bottom and the textile 10 on the top is produced. That is, a paperboard having a textile surface is produced. The finished paperboard 30 is conveyed to a take-up spool (not shown) by means of a pair of driven rolls 41 rearward of the drive rolls 40 as indicated by arrow T.

Preferably, weight percentage of the polypropylene should be increased if surface of at least one of the paperboard 20 or the textile 10 is rough.

Embodiment I

The weight percentage of the polypropylene is 70%, the weight percentage of the polyethylene is 30%, and the tank 50 is heated to a temperature in a range of 280° C. to 300° C.

Embodiment II

The weight percentage of the polypropylene is 85%, the weight percentage of the polyethylene is 15%, and the tank 50 is heated to a temperature in a range of 320° C. to 330° C.

Embodiment III

The weight percentage of the polypropylene is 78%, the weight percentage of the polyethylene is 22%, and the tank 50 is heated to a temperature in a range of 300° C. to 320° C.

The production speed of the finished paperboard 30 can be increased to about 350 meters per minute.

Lateral extent (i.e., width) of each of the paperboard 20 and the textile 10 can be increased to about 2.8 m. Preferably, widths of both the paperboard 20 and the textile 10 are the same.

While the invention herein disclosed has been described by means of specific embodiments, numerous modifications and variations could be made thereto by those skilled in the art without departing from the scope and spirit of the invention set forth in the claims.

What is claimed is:

1. A process of manufacturing a paperboard comprising the steps of:
   (a) mixing a predetermined weight percentage of polypropylene and a predetermined weight percentage of polyethylene in a tank;
   (b) heating the tank to a predetermined temperature for forming an adhesive of the polypropylene and the polyethylene;
   (c) flowing the adhesive out of the tank to coat on an outer surface of a continuous paperboard member moving thereunder; and
   (d) moving steadily a continuous textile toward a joining line of a pair of opposite rotating rolls so that the rolls press the textile, the adhesive, and the paperboard member to cause the adhesive to adhere the textile and the paperboard member together to produce the finished paperboard having a textile surface;
   wherein the predetermined weight percentage of the polypropylene is about 70% to 85%, the predetermined weight percentage of the polyethylene is about 15% to 30%, and the predetermined temperature is in a range of 280° C. to 330° C.

2. The process of claim 1, wherein the predetermined weight percentage of the polypropylene is 70%, the predetermined weight percentage of the polyethylene is 30%, and the predetermined temperature is in a range of 280° C. to 300° C.

3. The process of claim 1, wherein the predetermined weight percentage of the polypropylene is 85%, the predetermined weight percentage of the polyethylene is 15%, and the predetermined temperature is in a range of 320° C. to 330° C.

4. The process of claim 1, wherein the predetermined weight percentage of the polypropylene is 78%, the predetermined weight percentage of the polyethylene is 22%, and the predetermined temperature is in a range of 300° C. to 320° C.

* * * * *